United States Patent Office 3,553,242  
Patented Jan. 5, 1971

---

3,553,242  
PROCESS FOR PREPARING 1,3-DISILYL-1,3,2,4-DIAZADISILETIDINES  
Walter Fink, Zurich, Switzerland, assignor to Monsanto Company, St. Louis, Mo., a corporation of Delaware  
No Drawing. Continuation-in-part of application Ser. No. 625,309, Mar. 23, 1967. This application Apr. 26, 1968, Ser. No. 724,592  
Int. Cl. C07f 7/02  
U.S. Cl. 260—448.2          10 Claims

ABSTRACT OF THE DISCLOSURE

A process for making compounds of formula

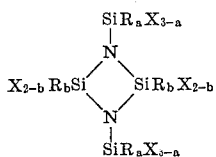

by reacting a cyclic silazane of the formula $(R_2SiNH)_c$ with a halosilane of the formula $R_aSiX_{4-a}$ or by heating a compound of the formula $X_{3-a}R_aSiNHSiR_aX_{3-a}$ in the presence of a hydrochloric acid binding agent. These compounds find utility as high temperature resistant liquids and intermediate in the preparation of polymeric products.

---

This application is a continuation-in-part of copending application Ser. No. 625,309, filed Mar. 23, 1967, and now abandoned.

The present invention is concerned with a process for preparing 1,3-disilyl-1,3,2,4-diazadisiletidines of the general formula (A) 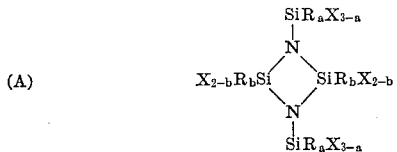

in which the groups R, taken singly signify fluorine atoms, hydrogen atoms, identical or different, possibly substituted and/or ethylenically or acetylenically unsaturated hydrocarbyl groups or heterocyclic groups or silyl groups of the formulae

also the organic groups and the silyl groups can be attached via an oxygen atom to the silicon atoms and may repeat with a possibly branched chain up to ten times, two organic groups R, taken together, form with their silicon atom a silacycloalkyl group which can contain up to 11 methylene units and be interrupted by additional heteroatoms or heteroatom groups like O, Si, NR′, NSiR$_3$ and SiR$_2$(R′=organic group which occurs in amines), X represents a chlorine atom, bromine atom or iodine atom, $a$ stands for a number 0, 1, 2 or 3, and $b$ stands for a number 0, 1 or 2 and the symbols $a$ or $b$ on different silyl groups can be identical or different. Normally, the R groups will have not more than 24 carbon atoms and for many purposes R groups having not more than 8 carbon atoms are suitable.

Compounds showing the Formula A where R=methyl have been obtained hitherto by decomposition of certain, possibly alkali metallated silazanes [W. Fink, Chem. Ber. 96, 1071 (1963)]. A further well-known process comprises the reaction of a an octaorganotrisilazane in the form of a dialkali salt with a diorganosilicon dihalide [W. Fink, Angew. Chem. 73, 736 (1961)]. Still a further process is based on the reaction of a primary amine with a diorganodihydrosilane in the presence of an alkali metal hydride as a catalyst, copending application S.N. 465,773, filed June 21, 1965.

Particularly interesting are the 1,3 - bis - (halosilyl)-1,3,2,4-diazadisiletidines, i.e., the corresponding derivatives showing in their terminal silyl group at least one halogen atom. When the halogen atom is, e.g., a fluorine atom, such compounds are thermally very resistant and, as a rule, liquid compounds and can be used in all instances where high temperature resistant liquids are necessary. When the halogen atom is reactive like, e.g., a chlorine atom, bromine atom or iodine atom, the compounds are useful intermediates for the manufacture of novel derivatives, especially polymeric products, which can be used in the place of known polymers and which are often better suited owing to their greater thermal and hydrolytic stability; see our copending application S.N. 595,033, filed Nov. 17, 1966. Compounds showing the Formula A where X is a chlorine atom and $a$ stands for the number 2, could be prepared up to now by reacting an at least double alkali metallated cyclotrisilazane or cyclotetrasilazane with a diorganodichlorosilane, U.S. 3,230,242. A compound having R=methyl and belonging to the same class has been obtained by reacting 1,3-dichloro-tetramethyldisilazane with sodium-bis-(trimethylsilyl)-amide [P. Geymayer and E. G. Rochow, Angew. Chem. 77, 618 (1965)].

A simple process has now been found for the production of 1,3-disilyl-1,3,2,4-diazadisiletidines, which process is characterized in that a cyclic silazane of the general formula (B)          $(R_2SiNH)_c$ in which R is defined as before and $c$ stands for 3 or 4, and a halosilane of the general formula (C)          $R_aSiX_{4-a}$ in which R, X and $a$ are defined as before, preferably using a molar ratio of at least 1:$c$ are heated, possibly under pressure, in the presence of a hydrogen halide scavenger.

Examples of groups R are fluorine atoms, alkyls, alkenyls and alkynyls such as methyl, ethyl, vinyl, ethynyl, n-propyl, iso-propyl, allyl, propenyl, propargyl, propynyl, n-butyl, iso-butyl, sec-butyl, tert-butyl, methallyl, 1-butenyl, crotyl, butadienyl, 1-butynyl, 2-butynyl, 1-buten-2-ynyl and higher aliphatic groups having up to 24 carbon atoms such as undecenyl, dodecyl, myristyl, oleyl and tetracosyl; moreover, cycloalkyls, cycloalkenyls and cycloalkynyls such as cyclobutyl, cyclopentyl, cyclopentenyl, cyclopentadienyl, cyclohexyl, cyclohexenyl, cyclohexadienyl, cyclohexynyl and greater alicyclic groups having up to 12 carbon atoms such as cyclooctyl, cyclododecyl, cyclooctatrienyl, cyclododecatrienyl and bicyclohexyl; moreover aralkyls, aralkenyls and aralkynyls such as benzyl, cuminyl, phenylethyl, styryl, phenylethynyl, phenylpropyl, 3-phenylallyl, 2-phenylallyl, 1-phenylallyl, cinnamyl, 1-phenylpropynyl, 1-phenylpropargyl, diphenylmethyl, triphenylmethyl, α-naphthylmethyl, β-naphthylmethyl, 1-(α-naphthyl)ethyl, 2-(α-naphthyl)ethyl, 1-(β-naphthyl)ethyl, 2-(β-naphthyl)ethyl, 1-(α-naphthyl)ethenyl, 2-(α-naphthyl)ethenyl, 1-(β-naphthyl)ethenyl, 2-(β-naphthyl)ethenyl, α-naphthylethynyl and β-naphthylethynyl; moreover, alkaryls, alkenylaryls and alkynylaryls such as tolyl, xylyl, mesityl, duryl, ethylphenyl, cumyl, vinylphenyl, ethynylphenyl, propargylphenyl, propynylphenyl, tert-butylphenyl, α-vinylnaphthyl, β-vinylnaphthyl, α-ethynylnaphthyl and β-ethynylnaphthyl; moreover, aryls such as phenyl, o-biphenylyl, m-biphenylyl, p-biphenylyl, m-terphenylyl, p-terphenylyl, 1-naphthyl, 2-naphthyl, 2-anthryl, 9-anthryl, 1-phenanthryl, 2-phenanthryl, 3-phenanthryl, 4-phenanthryl, 9-phenanthryl, indanyl, indenyl; moreover heterocyclic groups such as pyrryl, furyl, tetrahydrofuryl, benzofuryl, thienyl, pyrrolinyl, pyrrolidyl, pyrazolyl, pyrazolinyl, pyrazolidyl, imidazolyl, imidazolidyl, benzimidazolyl, thiazolyl, oxazolyl, iso-oxazolyl, triazolyl, pyrazinyl, pyrimidyl, pyridazinyl, pyridyl, pyranyl, thiopyranyl, piperidyl, morpholinyl, thiazinyl, triazinyl, quinolyl, quinazolyl, indolyl, phenazinyl and carbazolyl.

Suitable reactants are optional well-known and available cyclotrisilazanes and cyclotetrasilazanes (B). Some are found in the technical literature. There are known derivatives having R=methyl, ethyl, n-butyl, phenyl, methoxy, ethoxy, iso-propoxy, n-butoxy, t-butoxy, cyclohexoxy and phenoxy. Moreover, derivatives having groups R different from each other like hydrogen and methyl, ethyl or phenyl; methyl and ethyl, bromoethyl, pentafluoroethyl, phenyl, vinyl, allyl, methoxy, ethoxy, iso-propoxy, t-butoxy, cyclohexoxy or phenoxy; methoxy and vinyl or phenyl, and others. Other starting products can be prepared in similar manner.

Optional halosilanes (C) containing at least one reactive halogen atom linked to the silicon atom serve as further reactants. Some suitable halosilanes are cited below in order to illustrate the possibilities of combining the groups R: tetrachlorosilane, trichloro-hydrosilane, dichloro-dihydrosilane, chloro-trihydrogenosilane, methyl-trichlorosilane, dimethyl-dichlorosilane, trimethyl-chlorosilane, phenyl-trichlorosilane, diphenyl-dichlorosilane, triphenyl-chlorosilane, methyl-phenyldichlorosilane, dimethyl-phenyl - chlorosilane, diphenyl - methyl - chlorosilane, methyl-fluoro-dichlorosilane, methyl-difluoro-chlorosilane, methyl-hydrogeno-dichlorosilane, methyl - dihydrogenochlorosilane, dimethyl-hydrogeno-chlorosilane, methyl-hydrogeno-fluoro-chlorosilane. Also included are the halosilanes, where two organic groups form together with their silicon atom a ring, as e.g., in the compounds 1-chloro-1-methyl-silacyclobutane, 1,1 - dichloro - silacyclopentane, 1-chloro-1-phenyl-silacyclohexane, 1,1-dichloro-silacycloheptane, 1-chloro-1-phenyl-1-sila-2,5-dioxycyclopentane, 1,1-dichloro-1-sila-2-oxacyclohexane, 1-chloro-1,4,4-trimethyl-1,4-disilacyclohexane, 1-chloro - 1,4,4 - trifluoro-1,4-disilacyclohexane and 1,1-dichloro-4-methyl-1-sila-4-azacyclohexane.

Such divalent organic groups can occur also in other starting compounds like in the cyclic silazanes (B) or in the linear halodisilazanes (D) which are described below.

When in this description or in the claims, the term "diorgano" arises, for the sake of simplicity this means that such divalent organic groups are included.

Other hydrocarbon groups or heterocyclic groups which can show ethylenic and/or acetylenic unsaturation in place of methyl or phenyl, and the corresponding bromides or iodides can be brought to reaction instead of the chlorides, although the cheaper and technically more available chlorides generally will be preferred herein. The organic groups moreover can be linked each through an oxygen atom to the silicon atom.

If the halosilane to be reacted possesses only one reactive halogen atom, it will become the terminal silyl group of the end product. This reaction proceeds with, e.g., a halosilane and a tertiary amine as acid-fixing agent in the ideal case according to the Equation (a):

$2(R_2SiNH)_c + 2cR_3SiCl + 2cNR'_3 \longrightarrow$

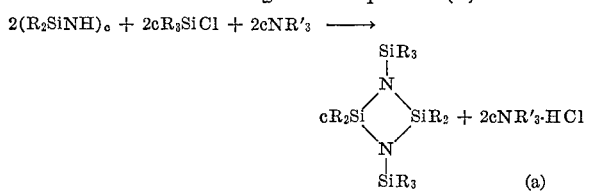

(a)

When the halosilane to be reacted possesses two or more reactive halogen atoms, it can be found in the end product as exocyclic silyl group and/or as constituent of the ring, e.g., there can be formed a mixture of various 1,3-disilyl-1,3,2,4-diazadisiletidines, thereby one or both cyclic silyl groups also can contain reactive halogen atoms. If the starting cyclosilazane (B) and the halosilane (C) to be reacted show the same groups, e.g., methyl groups, on their silicon atoms, the reaction of invention proceeds with a dihalosilane, e.g., dimethyldichlorosilane, always uniformly and the exocyclic silyl groups contain a halogen atom, e.g., chlorine atom. This reaction proceeds according to the Equation (b):

$2(R_2SiNH)_c + 2cR_2SiCl_2 + 2cNR'_3 \longrightarrow$

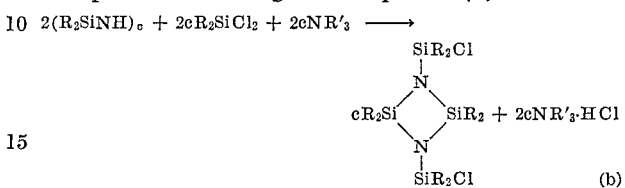

(b)

It has been found that in the reaction a linear halodisilazane of the formula (D)    $X_{3-a}R_aSiNHSiR_aX_{3-a}$ an intermediary products is made and this this compound, if it contains at least one reactive halogen atom on each silicon atom, is converted on heating in the presence of at least a stoichiometric quantity of an acid-binding agent into an end product of the invention.

A modified process comprises the use of a halodisilazane (D) as formulated above, instead of a cyclotrisilazane or cyclotetrasilazane. These halodisilazanes can be obtained by reaction of a cyclotrisolazane or cyclotetrasilazane (B) with a halosilane (C) in a molar ratio preferably of at least 1:$n$. Preferably, there is used an excess of halosilane. The cyclosilazanes (B) can be contaminated with ammonium salts resulting from their preparation, and these ammonium salts do not hinder this intermediary reaction. The separation of the mixture consisting of a symmetrical or an unsymmetrical halodisilazane or of both, according to the reactants used, in feasible in most cases by distillation. By this way more uniform end products can possibly be attained.

With, e.g., a monochlorodisilazane the last reaction step proceeds probably via an unstable intermediate according to the Equation (c):

$2R_3SiNHSiR_2Cl + NR'_3 - [R_3SiN=SiR_2] \longrightarrow$

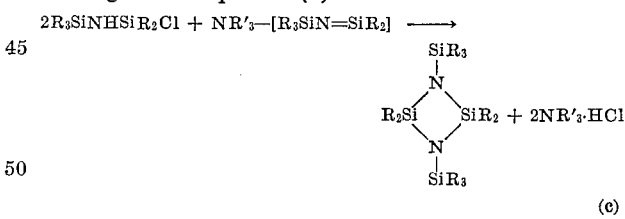

(c)

Those skilled in the art will recognize that with an unsymmetrically substituted dihalodisilazane, e.g.

ClMe$_2$SiNHSiPr$_2$Cl (Me, Pr=methyl, propyl) there are two possibilities for the cleavage of hydrohalide and consequently also there can be formed two different end products. In the case mentioned above, the exocyclic silyl group can be a chloro-dipropylsilyl group as well as a chloro-dimethylsilyl group. In other cases, e.g., with ClMe$_2$SiNHSiPH$_2$Cl (Ph=phenyl) or ClMe$_2$SiNHSiMe$_2$F, one can predict which of the two halogen atoms will be released as hydrogen chloride, since a chlorine atom being in the chlorodimethylsilyl group is more reactive than in the chloro-diphenylsilyl group, or since a chlorine atom linked to a silicon atom is more easily cleaved than a fluorine atom.

These facts are accordingly applicable to the reaction (b). It has been found that the enumerated hydrocarbyl groups and heterocyclic groups may show substituents and these substituents do not hinder the reaction of invention. Examples of such substituents arising in well-known halosilanes (C) are: Cl, Br, F, I, OR" (R"=organic group occurring in ethers), NH'$_2$ (R'=organic group occurring in amines), CO, CS, CN and NO$_2$; moreover, silyl groups SiR$_3$ as they have been defined at the beginning of this description. These silyl groups may be attached also via an oxygen atoms.

Examples of some halogenated hydrocarbyl groups are: chloromethyl, dichloromethyl, trichloromethyl, bromomethyl, dibromomethyl, tribromomethyl, fluoromethyl, difluoromethyl, iodomethyl, diiodomethyl, triiodomethyl, trifluoromethyl, 1-chloroethyl, 2-chloroethyl, 1-bromoethyl, 2-bromoethyl, 1-fluoroethyl, 2-fluoroethyl, 1,2-dichloroethyl, 1,2-difluoroethyl, 2-trichloroethyl, 2-trifluoroethyl, pentafluoroethyl, 2-chlorovinyl, 1-chlorovinyl, 1,2-dichlorovinyl, trichlorovinyl, trifluorovinyl, bromophenyl, fluorophenyl, iodophenyl, difluorophenyl, trifluorophenyl, pentafluorophenyl, trichloromethylphenyl and bis(trifluoromethyl)phenyl. Other hydrocarbyl groups and heterocyclic groups enumerated above may be halogenated in similar manner.

The ether groups are derived from the same organic groups as cited before, being attached via an oxygen atom. The ether groups may repeat with formation of straight chains or branched chains. As examples are cited: methoxymethylenoxy, methoxyethylenoxy, ethoxyethylenoxy, tert - butoxy-tert - butylenoxy, veratroxy, anisoxy, phenetoxy, 3,4 - dimethoxyphenenyloxy, 3-phenoxyphenylenoxy, 3-phenoxy-4-methoxyphenenyloxy, polymethylenoxy of the general formula

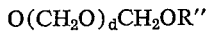

(R''=as above; $d=1-9$) and parent substituents showing ethylene or propylene groups in the place of the methylene groups. Such ether groups, according to the definition, may be linked also directly to the silicon atoms.

Especially valuable products, distinguished by their great thermal and hydrolytic resistance and showing wide liquid range, or intermediates fit to the preparation of such products, contain at least one diaryl ether grouping [ArOAr] derived from one of the following compounds: phenoxybenzene, toloxybenzene, 2-biphenylylether, 3-biphenylylether, 4-biphenylylether, 2-biphenylyl-4-biphenylylether, 3-biphenylyl-4-biphenylylether, 1-(2-biphenylyloxy)-4-phenoxybenzene, 1-(3-biphenylyloxy)-2-phenoxybenzene, 1-(3-biphenylyloxy)-3-phenoxybenzene, 1-(3-biphenylyloxy)-4-phenoxybenzene, 1 - (4 - biphenylyloxy)-2-phenoxybenzene, 1 - (4 - biphenylyloxy)-3-phenoxybenzene, 1-(4-biphenylyloxy)-4-phenoxybenzene, 2,2'-diphenoxybiphenyl, 3,3'-diphenoxybiphenyl, 4,4'-diphenoxybiphenyl, 2,3'-diphenoxybiphenyl, 2,4'-diphenoxybiphenyl, 3,4'-diphenoxybiphenyl, 2,4-diphenoxybiphenyl, 2,5-diphenoxybiphenyl, 2,6-diphenoxybiphenyl, 3,4-diphenoxybiphenyl, 3,5-diphenoxybiphenyl, 1,2,3-triphenoxybenzene, 1,2,4-triphenoxybenzene, 1,3,5 - triphenoxybenzene, 2-phenoxyphenylether, 3-phenoxyphenylether, 4-phenoxyphenylether, 2-phenoxyphenyl-3-phenoxyphenylether, 2-phenoxy - 4' - phenoxyphenylether, 3-phenoxyphenyl-4'-phenoxyphenylether, 1-phenoxynaphthalene, 2-phenoxynaphthalene, 1,1'-dinaphthalene ether, 2,2'-dinaphthalene ether, 1,2'-dinaphthalene ether, moreover long chain polyaroxyaryls ArO(ArO)$_d$Ar (Ar=possibly lower alkyl substituted phenyl, biphenyl or naphthyl; $d$ is defined as before). One hydrogen atom or several hydrogen atoms of the enumerated aryl groups may be replaced by fluorine atoms, whereby the thermoplasticity of the end products will be increased. These aromatic ether groups may be linked to the silicon atoms also via an oxygen atom.

Tertiary amino groups are derived from the enumerated organic groups linked via a nitrogen atom. The two organic groups may be identical or different. Also comprised are the heterocyclic tertiary amino groups derived from heterocyclic secondary amines such as ethylene imine, 1,2-propylene imine, pyrrole, pyrroline, pyrrolidine, pyrazole, pyrazoline, N-methylpyrazolidine, imidazole, imidazoline, N-ethylimidazolidine, thiazolidine, oxazolidine, triazole, N,N'-dibutyltriazolidine, piperidine, N-dodecylpiperazine, morpholine, thiazine, indole, carbazole and phenoxazine.

Acyl groups should be considered especially as substituents having a CO group. These form a keto group with the organic group to which they are attached. They can contain further substituents as have been cited.

Examples of some acyl substituents are: acetyl, n-propionyl, iso-propionyl, acrylyl, crotonyl, propiolyl, n-butyryl, iso-butyryl, valeryl, pivalyl, enanthyl, caprylyl, lauroyl, myristoyl, oleoyl, stearoyl, phenylacetyl, diphenylacetyl, cinnamoyl, benzoyl, naphthoyl, cumoyl, 4-biphenylylcarbonyl, anisoyl, phenetoyl, veratroyl, 2,3,4-, 1,4,5- and 3,4,5-trimethoxybenzoyl, p-diphenylaminobenzoyl, cyanacetyl, trimethylsilylanthranoyl, methoxyacetyl, dimethylaminoacetyl, trimethylsilylaminoacetyl, bis(triphenylsilyl)aminoacetyl, trimethylsiloxyacetyl, trichloroacetyl, trifluoroacetyl, 2-furoyl, 3-furoyl, pyrroyl, including the thio analogues containing a CS group.

Examples of some simple representatives of the great class of cyanated and nitrated organic groups are: 2-cyanoethyl, 2-nitroethyl, 2-cyano-n-propyl, 3-cyano-n-propyl, 2-nitro-n-propyl, 3-nitro-n-propyl, 2,3-dicyano-n-butyl and 4-nitro-n-butyl. Other hydrocarbyl groups or heterocyclic groups such as have been named above for R can be present instead of ethyl, n-propyl and n-butyl.

Examples of some silyl groups of the general formula SiR$_3$ are: trimethylsilyl, triphenylsilyl, trimethoxysilyl, triphenoxysilyl, dimethoxy - phenoxysilyl, methoxy - diphenoxysilyl, methyl-dimethoxysilyl, dimethyl-methoxysilyl, phenyl-dimethoxysilyl, methyl-diphenoxysilyl, methylphenyl-methoxysilyl and methyl-phenyl-phenoxysilyl, including silyl groups, where Si is a constituent of a heterocycle as in the groups silacyclopentyl, silacyclopentenyl, silacyclohexyl, silacyclohexenyl and silacycohexadienyl; moreover, fluorosilyl groups of the general formulae SiF$_3$, SiF$_2$R*, and SiFR*$_2$ (R*=organic group, possibly linked via an oxygen atom) such as trifluorosilyl, methyldifluorosilyl, dimethylfluorosilyl, phenyldifluorosilyl, diphenylfluorosilyl, methyl-phenylfluorosilyl, methoxydifluorosilyl, dimethoxyfluorosilyl, methoxy-phenoxyfluorosilyl, methoxyphenylfluorosilyl, phenoxy-methylfluorosilyl; moreover, hydrosilyl groups of the general formulae SiH$_3$, SiH$_2$R*, SiHR*$_2$, SiHFR* and SiHF$_2$ such as trihydrosilyl, methyldihydrosilyl, dimethylhydrosilyl, phenyldihydrosilyl, diphenyldihydrosilyl, methylphenylhydrosilyl, methoxydihydrosilyl, dimethoxyhydrosilyl, phenoxydihydrosilyl, diphenoxyhydrosilyl, methoxy-phenoxyhydrosilyl, methoxy-phenylhydrosilyl, phenylfluorohydrosilyl. Other analogous silyl groups contain instead of methyl, phenyl, methoxy or phenoxy, other organic groups such as have been mentioned for R.

The simplest representatives of substituents having Si—Si or Si—O—Si bonds are pentamethyldisilanyl, 1-trimethylsilyl-tetramethyldisilanyl, 1-bis(trimethylsilyl)-trimethyldisilanyl, pentamethoxydisilanyl, pentamethoxydisiloxanyl, 1-trimethoxysilyl-tetramethoxydisiloxanyl and 1-bis(trimethoxysilyl)-trimethoxydisiloxanyl. Analogous substituents contain in the place of methyl other organic groups such as have been enumerated for R, or fluorine atoms or hydrogen atoms.

The cited silyl groups can be linked to the organic groups or to the silicon atoms of the 1,3-disilyl-1,3,2,4-diazadisiletidines also via an oxygen atom.

The number of well-known substituted halosilanes utilizable herein also is very large. Well-known examples are: pentafluoroethyl-methyl-dichlorosilane, tetrafluoro-2-chloroethyl - trichlorosilane, 1,2 - dichlorovinyl-trichlorosilane, p-chlorophenyl-vinyl-dichlorosilane, bis(p-fluorophenyl( - dichlorosilane, bis(3,5 - dibromophenyl)-methylchlorosilane, tris[(3,5 - bis - trifluoromethyl)phenyl]-chlorosilane, p-methoxyphenyl - trichlorosilane, 2-methoxy - 5 - bromophenyl-trichlorosilane, phenoxyphenylpropyl - trichlorosilane, p-dimethylaminophenyl-methyl-dichlorosilane, methyl - β - cyanoethyl-dichlorosilane and tris(acetylacetonyl)-chlorosilane.

Of course, the enumerated substituents can occur also in the starting cyclosilazanes (B) or in the linear halodisilazanes (D). Such starting products can be prepared in similar manner as the unsubstituted derivatives.

On practicing the invention, a cyclotrisilazane or cyclotetrasilazane and halosilane in a molar ratio of 1:3 or 1:4, respectively, are heated in the presence of a hydrochloric acid scavenger. Normally, the reaction is carried out under exclusion of moisture and oxygen, e.g., in a nitrogen atmosphere at temperatures between about 150 to 400° C., preferably in the range of about 150 to 250° C. Using low boiling halosilanes, the reaction is expediently effected by application of pressure.

Tertiary amines such as trimethylamine, triethylamine, tri-iso-propylamine, N-methylpiperidine, N,N'-di-n-butylpiperazine and pentamethylguanidine are preferably used as agents for binding the hydrochloric acid. An equimolar quantity with respect to the halosilane generally will be sufficient. However, an excess may be also used. A catalytic amount of another Lewis acid, e.g., aluminum chloride, can be present besides the halosilane, whereby the reaction of invention may be promoted.

The reaction can be carried out in most cases without solvent. A solvent may be advantageous to better control the reaction. Suitable solvents are, e.g., aliphatic, aromatic and hydroaromatic hydrocarbons and halohydrocarbons, aliphatic, aromatic and alicyclic ethers, moreover, acetonitrile, adiponitrile, acetone, acetophenone, dimethylsulfone, diphenylsulfone, dimethylformamide, pyridine, tetramethylurea and others.

When the reaction is carried out according to the modified process conforming to the scheme (c), a cyclotrisilazane or cyclotetrasilazane and a halosilane in a molar ratio of at least 1:3 or 1:4, respectively, are heated and the formed halodisilazane or halodisilazanes (B), possibly after previous isolation or separation, are further heated with an agent for the hydrochloric acid binding as indicated above.

A further modification of the process comprises the use of the mixture resulting from the manufacture of the cyclosilazanes from halosilanes and ammonia, which mixture containing ammonium halide as a by-product is brought to reaction with further halosilane to obtain the intermediate compound (B) which is converted as indicated above.

EXAMPLE 1

Mixtures of 21.9 g. (0.1 mole) of hexamethylcyclotrisilazane, 38.7 g. (0.3 mole) of dimethyldichlorosilane and 36.4 g. (0.36 mole) of triethylamine are heated in an autoclave for 3 hours at the temperatures indicated in the table below. After cooling, the reaction mixture is taken up in a hexane, the triethylamine chlorohydrate is filtered off, and upon evaporation of the solvent the residue is fractionally distilled.

Reaction temperatures and yields for each of the four runs of 1,3-bis-(dimethylchlorosilyl)-2,2,4,4-tetramethyl-1,3,2,4-diazadisiletidine; B.P. 108–110° C./12 mm. are shown in the following table:

| Temperature, ° C.: | Yield, Percent |
|---|---|
| 150 | 28.3 |
| 170 | 83.4 |
| 190 | 84.5 |
| 210 | 69.5 |

EXAMPLE 2

A mixture of 29.27 g. (0.1 mole) of octamethylcyclotetrasilazane, 51.6 g. (0.4 mole) dimethyldichlorosilane and 40.47 g. (0.4 mole) of triethylamine is brought to reaction as in Example 1. Yield 63.8 g. (96.2%). The product is identical with that obtained according to Example 1.

EXAMPLE 3

Mixtures of 24.3 g. (0.12 mole) of 1,3-dichlorotetramethyldisilazane and 14.3 g. (0.14 mole) of triethylamine are heated in an autoclave at temperatures indicated in the table below for 3 hours. The mixture is worked up as in Example 1. Yields for each of the four runs are shown in the table below. The product is identical with that obtained according to Example 1.

| Temperature, ° C.: | Yield, Percent |
|---|---|
| 150 | 28.4 |
| 170 | 82.7 |
| 190 | 84.3 |
| 210 | 69.4 |

EXAMPLE 4

A mixture of 21.95 g. (0.1 mole) of hexamethylcyclotrisilazane, 32.6 g. (0.3 mole) of trimethylchlorosilane and 30.4 g. (0.35 mole) of triethylamine is heated at 245 to 265° C. for 5 hours in an autoclave (25 atm.). Yield 15.6 g. (35.9%) of 1,3-bis-(trimethylsilyl)-2,2,4,4-tetramethyl-1,3,2,4-diazadisiletidine; B.P. 85° C.; M.P. 38–39° C. $d_4^{20}$ 0.998.

What I claim is:

1. A process for preparing 1,3-disilyl-1,3,2,4-diazadisiletidines of the general formula

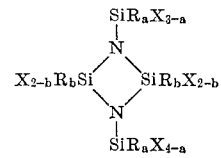

in which the groups R, represent a lower alkyl group, X represents a chlorine atom, bromine atom or iodine atom, $a$ stands for a number 0, 1, 2 or 3 and $b$ stands for a number 0, 1 or 2 and the symbols $a$ or $b$ on different silyl groups can be identical or different comprising reacting at a temperature at which HCl splits off a cyclic silazane of the general formula $$(R_2SiNH)_c$$

in which R is defined as above and $c$ stands for a number 3 or 4, and a halosilane of the general formula $$R_aSiX_{4-a}$$

in which the symbols are defined as above, or heating at a temperature at which HCl splits off a linear halodisilazane of the general formula $$X_{3-a}R_aSiNHSiR_aX_{3-a}$$

in which the symbols are defined as above and there is present at least one X, are heated, possibly under application of pressure, in the presence of a hydrochloric acid binding agent.

2. A process of claim 1 wherein a tertiary amine is used, e.g., triethylamine, as hydrochloric acid binding agent, in an amount which is at least about equimolar with respect to said halosilane to be reacted.

3. A process of claim 1 wherein the ratio of reactants is about 1:3:3 or 1:4:4 cyclotri- or cyclotetrasilazane to said halosilane to hydrochloric acid binding agent.

4. A process of claim 1 wherein the reaction is carried out under exclusion of moisture and oxygen in an inert atmosphere, e.g., nitrogen atmosphere, at temperatures lying between about 150 to 400° C.

5. A process of claim 1 wherein another Lewis acid, e.g., aluminum chloride, is present in an amount of 0.1 to 5% by weight with respect to said halosilane.

6. A process according to claim 1 wherein the halosilane is a diloweralkyldihalosilane.

7. A process according to claim 1 wherein the halodisilazane is a 1,3-dihalotetraloweralkyldisilazene.

8. A process of claim 1 wherein hexamethylcyclotrisilazane or octamethylcyclotetrasilazane, dimethyldichlorosilane and triethylamine are heated in a molar proportion of about 1:3:3 or 1:4:4, respectively, at about 150 to 250° C. under pressure.

9. A process of claim 1 wherein 1,3-dichloro-tetramethyldisilazane and triethylamine are heated in a molar proportion of about 1:1 at about 150 to 250° C. under pressure.

10. A process of claim 1 wherein hexamethylcyclotrisilazane, trimethylchlorosilane and triethylamine are heated in a molar proportion of about 1:3:3 at temperatures in the range of about 150 to 250° C. under pressure.

References Cited

UNITED STATES PATENTS

| 3,230,242 | 1/1966 | Fink | 260—448.2 |
| 3,297,592 | 1/1967 | Fink | 260—448.2X |
| 3,468,922 | 9/1969 | Fink | 260—448.2 |

TOBIAS E. LEVOW, Primary Examiner

W. F. W. BELLAMY, Assistant Examiner

U.S. Cl. X.R.

260—46.5